(12) United States Patent
Jin (10) Patent No.: US 10,975,760 B2
(45) Date of Patent: Apr. 13, 2021

(54) WASTE GATE VALVE FOR TURBOCHARGER

(71) Applicants: Hyundai Motor Company, Seoul (KR); Kia Motors Corporation, Seoul (KR)

(72) Inventor: Seok Beom Jin, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 109 days.

(21) Appl. No.: 15/953,625

(22) Filed: Apr. 16, 2018

(65) Prior Publication Data
US 2019/0170059 A1    Jun. 6, 2019

(30) Foreign Application Priority Data

Dec. 1, 2017 (KR) .......................... 10-2017-0164323

(51) Int. Cl.
| | |
|---|---|
| *F02B 37/18* | (2006.01) |
| *F16K 3/26* | (2006.01) |
| *F16K 3/24* | (2006.01) |
| *F01D 17/10* | (2006.01) |

(52) U.S. Cl.
CPC .......... *F02B 37/183* (2013.01); *F01D 17/105* (2013.01); *F16K 3/24* (2013.01); *F16K 3/262* (2013.01); *F16K 3/265* (2013.01); *F05D 2220/40* (2013.01); *F05D 2260/606* (2013.01)

(58) Field of Classification Search
CPC ........ F01D 17/08; F01D 17/10; F01D 17/105; F04D 15/0011; F04D 15/0022; F02B 37/18; F02B 37/183; F02B 37/186; F16K 3/26; F16K 3/262; F16K 3/265; F05D 2260/606
See application file for complete search history.

(56) References Cited

U.S. PATENT DOCUMENTS 5,368,276 A * 11/1994 Pfeiffer .................... B01J 8/082
                                                             137/240
5,855,117 A *  1/1999 Sumser ................. F01D 17/143
                                                             415/158

(Continued)

FOREIGN PATENT DOCUMENTS

JP        2009203835 A    9/2009
WO    WO-2004113686 A1 * 12/2004  ............. F01D 9/026

OTHER PUBLICATIONS

WO-2004113686-A1 Machine Translation, Dec. 2004, (Year: 2004).*

*Primary Examiner* — Courtney D Heinle
*Assistant Examiner* — Elton K Wong
(74) *Attorney, Agent, or Firm* — Mintz Levin Cohn Ferris Glovsky and Popeo, P.C.; Peter F. Corless (57) ABSTRACT

A waste gate valve for a turbocharger is provided that improves control responsivity, wear resistance and the flow uniformity of diverted exhaust gas by improving the operational structure thereof. The waste gate valve includes a turbine housing in which a portion of a bypass passage is formed along the inner circumferential surface of a discharge passage. A mixer ring includes bypass apertures therein that are arranged along the bypass passage formed in the inner circumferential surface of the discharge passage. Additionally, a control valve is configured to open or close the bypass apertures based on movement thereof.

6 Claims, 8 Drawing Sheets

(56) References Cited

U.S. PATENT DOCUMENTS

| | | | | |
|---|---|---|---|---|
| 6,648,594 B1* | 11/2003 | Horner | ............... | F04D 25/04 |
| | | | | 415/144 |
| 2012/0099965 A1* | 4/2012 | Ramb | ............... | F01D 17/105 |
| | | | | 415/145 |
| 2013/0251512 A1* | 9/2013 | Lombard | ............ | F02B 37/183 |
| | | | | 415/125 |
| 2014/0000256 A1* | 1/2014 | Hirth | ............... | F01D 17/141 |
| | | | | 60/605.2 |

* cited by examiner

WASTE GATE VALVE FOR TURBOCHARGER

CROSS-REFERENCE TO RELATED APPLICATION

This application claims the priority benefit of Korean Patent Application No. 10-2017-0164323, filed on Dec. 1, 2017, the disclosure of which is incorporated herein by reference.

BACKGROUND

1. Field of the Invention

The present invention relates to a waste gate valve for a turbocharger, and more particularly, for a waste gate that improves control responsivity and wear resistance by reducing the operational force applied thereto and which enhances the flow uniformity of diverted exhaust gas by improving the opening structure thereof.

2. Description of the Related Art

A turbocharger is a device that increases the output of an engine by driving an exhaust turbine using energy of exhaust gas, compressing air using a compressor directly connected to an exhaust turbine wheel, and supplying the compressed air to the engine. In other words, the turbine wheel is rotated by exhaust gas, the compressor is rotated by the rotational force of the turbine wheel and compresses air introduced through an air cleaner, and the compressed air is supplied to the respective cylinders of the engine. As a result, the output of the engine is increased.

A waste gate valve for a turbocharger is a discharge valve, which is configured to be open on an upstream side of the exhaust turbine and operates to control boost pressure. When the boost pressure of the exhaust side exceeds a predetermined level, the waste gate valve diverts exhaust gas to stop the operation of the turbine and prevent the compressor from being driven.

A conventional waste gate valve diverts exhaust gas to increase the temperature of a catalytic converter. However, the conventional waste gate valve is installed at a position that is eccentric from an inlet port of the catalytic converter, and thus the diverted exhaust gas is unable to be evenly introduced into the catalytic converter. Further, since the waste gate valve is installed adjacent to the turbine wheel and a bypass passage extends perpendicular to an outlet port of the turbine wheel, through which exhaust gas is discharged, flow interference between the exhaust gas discharged from the turbine wheel and the diverted exhaust gas occurs.

Further, to prevent the waste gate valve from floating when the turbocharger operates, a substantial operational force is required to be applied to the valve. Additionally, when exhaust gas collides with the waste gate valve, vibration and noise occur due to the presence of a gap between the valve and a lever.

The information disclosed in this section is merely for enhancement of understanding of the general background of the invention and should not be taken as an acknowledgement or any form of suggestion that this information forms the prior art already known to a person skilled in the art.

SUMMARY

Therefore, the present invention provides a waste gate valve for a turbocharger, which improves control responsivity and wear resistance by reducing the operational force applied thereto and which enhances the flow uniformity of diverted exhaust gas by improving the opening structure thereof.

In accordance with the present invention, the above and other objects may be accomplished by the provision of a waste gate valve for a turbocharger that may include a turbine housing that accommodates a turbine wheel therein and having a bypass passage formed therein to divert exhaust gas introduced into the turbine wheel to a discharge passage, a portion of the bypass passage being formed along an inner circumferential surface of the discharge passage, a mixer ring formed to block a region between the bypass passage and the discharge passage and having therein bypass apertures that are arranged along the bypass passage formed in an inner circumferential surface of the discharge passage, and a control valve configured to switch a state of the bypass apertures to an open state or a closed state via movement thereof to regulate a degree of opening of the bypass apertures.

The mixer ring may be fixedly inserted into a discharge pipe, and the control valve may be movably inserted between an outer circumferential surface of the mixer ring and an inner circumferential surface of the discharge pipe. The bypass passage may include a first passage formed between an introduction pipe through which exhaust gas may be introduced into the turbine housing and a discharge pipe through which exhaust gas may be discharged. The first passage may communicate with the introduction pipe and the discharge pipe, and a second passage may communicate with the first passage and may be formed in the shape of a recess that extends along an inner circumferential surface of the discharge pipe. The bypass apertures formed in the mixer ring may be disposed between the second passage and the discharge passage.

The recess defining the second passage may be formed such that a circumference of a first side thereof, disposed adjacent to the turbine wheel, has a smaller inner diameter than a circumference of a second (e.g., opposite) side thereof, disposed distant from the turbine wheel. A support flange may be formed along the circumference of the first side of the recess disposed adjacent to the turbine wheel, and an end of the mixer ring may be supported by the support flange.

The bypass apertures may be arranged at equidistant intervals from each other in a circumferential direction of the mixer ring. In particular, the bypass apertures may be formed such that the degree of opening of each of the bypass apertures is about the same as the degree of opening of all other bypass apertures when the control valve moves.

Additionally, the waste gate valve may further include an actuator configured to supply moving force to the control valve in an axial direction. The control valve may be formed in the shape of a ring that has a solid circumferential surface overall. When the control valve moves toward a first end portion or a second (e.g., opposite) end portion of the mixer ring in the axial direction, the control valve may overlap the bypass apertures or may move away from the bypass apertures, thereby regulating the degree of opening of the bypass apertures.

The length of the control valve in the axial direction may be shorter than the length of the mixer ring in the axial direction. The length of the control valve in the axial direction may be set to completely open or completely close the bypass apertures when the control valve moves within a predetermined displacement range in the axial direction. The control valve may include a first guide formed at an outer circumferential surface thereof in the axial direction, and the discharge pipe may include a second guide formed at an inner circumferential surface thereof in the axial direction. The second guide may be disposed at a position that corresponds to the position of the first guide, and may have a shape that corresponds to the shape of the first guide to guide movement of the control valve in the axial direction. The first guide may be formed to avoid exposure to the bypass passage when the bypass apertures are completely closed.

The waste gate valve may further include an actuator configured to supply rotational force to the control valve in a circumferential direction. The control valve may include therein overlap apertures formed in the circumferential direction thereof to be disposed at positions that correspond to the positions of the bypass apertures and to have a shape that corresponds to the shape of the bypass apertures. When the control valve rotates in the circumferential direction, the overlap apertures may overlap the bypass apertures or may move away from the bypass apertures, thereby regulating the degree of opening of the bypass apertures. The turbine housing may include therein a knob aperture formed to correspond to a displacement range of the control valve, and the control valve may include a knob that penetrates the knob aperture. The knob may have a first end fixed to the control valve and a second end (e.g., an opposite end) connected to the actuator.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

A waste gate valve for a turbocharger according to an exemplary of the present invention may include a turbine housing 100, a mixer ring 200, and a control valve 300. A detailed description of the present invention will now be made with reference to FIGS. 1 to 4B. A turbine wheel 110 may be accommodated in the turbine housing 100. A bypass passage 160 may be formed in the turbine housing 100 to divert exhaust gas, which is to be introduced into the turbine wheel 110, to a discharge passage 150. A portion of the bypass passage 160 may be formed along the inner circumferential surface of the discharge passage 150.

In particular, an introduction pipe 120 may be formed at a lateral surface of the turbine housing 100 to allow exhaust gas to flow into the turbine wheel 110 through an introduction passage 130, and a discharge pipe 140 may be formed at an end portion of the turbine housing 100 to allow the exhaust gas that has passed through the turbine wheel 110 to be discharged. The aforementioned bypass passage 160 may be formed between the introduction pipe 120 and the discharge pipe 140 to allow the exhaust gas introduced into the introduction pipe 120 to bypass the turbine wheel 110 and to flow into the discharge pipe 140.

The bypass passage 160 may include a first passage 161 and a second passage 162. The first passage 161 may be formed between the introduction pipe 120, through which exhaust gas is introduced into the turbine housing 100, and the discharge pipe 140, through which exhaust gas is discharged, to communicate with the introduction pipe 120 and the discharge pipe 140. The second passage 162 may communicate with the first passage 161 and may be formed in the shape of a recess that extends along the inner circumferential surface of the discharge pipe 140.

The mixer ring 200 may be formed to block the region between the bypass passage 160 and the discharge passage 150 and may have bypass apertures 210 therein that are arranged along the bypass passage 160 formed in the inner circumferential surface of the discharge passage 150. For example, the mixer ring 200 may be fixedly inserted into the discharge pipe 140 and the bypass apertures 210 formed in the mixer ring 200 may be disposed between the second passage 162 and the discharge passage 150 inside the discharge pipe 140.

The control valve 300 may be configured to switch the state of the bypass apertures 210 to an open state or a closed state via the movement thereof to regulate the degree of opening of the bypass apertures 210. For example, the control valve 300 may be movably inserted between the outer circumferential surface of the mixer ring 200 and the inner circumferential surface of the discharge pipe 140. The bypass apertures 210 may be opened or closed via the movement of the control valve 300.

In other words, according to the above-described configuration, the bypass apertures 210 may be arranged along the bypass passage 160 formed in the inner circumferential surface of the discharge pipe 140. Therefore, when the bypass apertures 210 are opened by the control valve 300, the exhaust gas discharged through the bypass apertures 210 may be evenly discharged along the inner circumferential surface of the discharge pipe 140. As a result, the flow uniformity of the diverted exhaust gas may be improved, and thus the exhaust gas may be evenly introduced into the catalytic converter, which is effective in increasing the temperature of the catalytic converter.

Figure 4A:
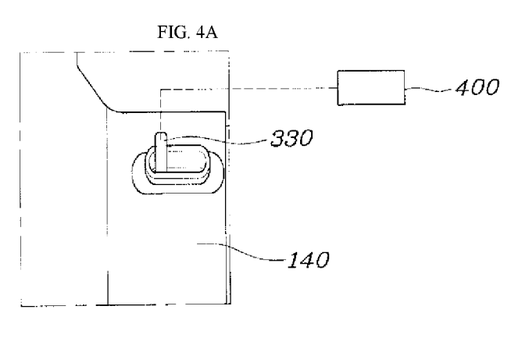
FIGS. 4A and 4B are views illustrating the opening operation and the closing operation of the waste gate valve illustrated in FIG. 2 according to an exemplary embodiment of the present invention.
Figure 4B:
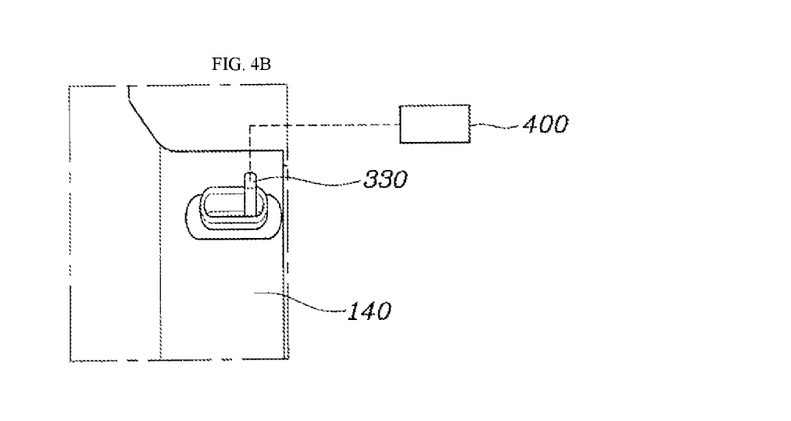

In addition, as shown in FIGS. 4A and 4B, the recess, which defines the second passage 162, may be formed such that the circumference of a first side of the recess, disposed adjacent to the turbine wheel 110, has a smaller inner diameter than the circumference of a second side (e.g., an opposite) of the recess, disposed distant from the turbine wheel 110. A support flange 170 may be formed along the circumference of the one side of the recess disposed adjacent to the turbine wheel 110.

A first end of the mixer ring 200 may be supported by the support flange 170, and a second end (e.g., an opposite end) of the mixer ring 200 may include a flange-shaped stopper that protrudes along the circumference thereof and may thus be fixed to the distal end of the discharge pipe 140. In other words, since the circumference of the first side of the recess that defines the second passage 162, disposed adjacent to the turbine wheel 110, has a smaller inner diameter than the circumference of the second side of the recess, and since the support flange 170 may be formed along the circumference of the first side of the recess, it may be possible to more stably support the first end portion of the mixer ring 200 within the discharge pipe 140, to avoid interference between the exhaust gas discharged via the turbine wheel 110 and the mixer ring 200, and consequently to prevent deterioration of the efficiency of the turbine even when the exhaust gas flows through the bypass apertures 210.

Figure 1:
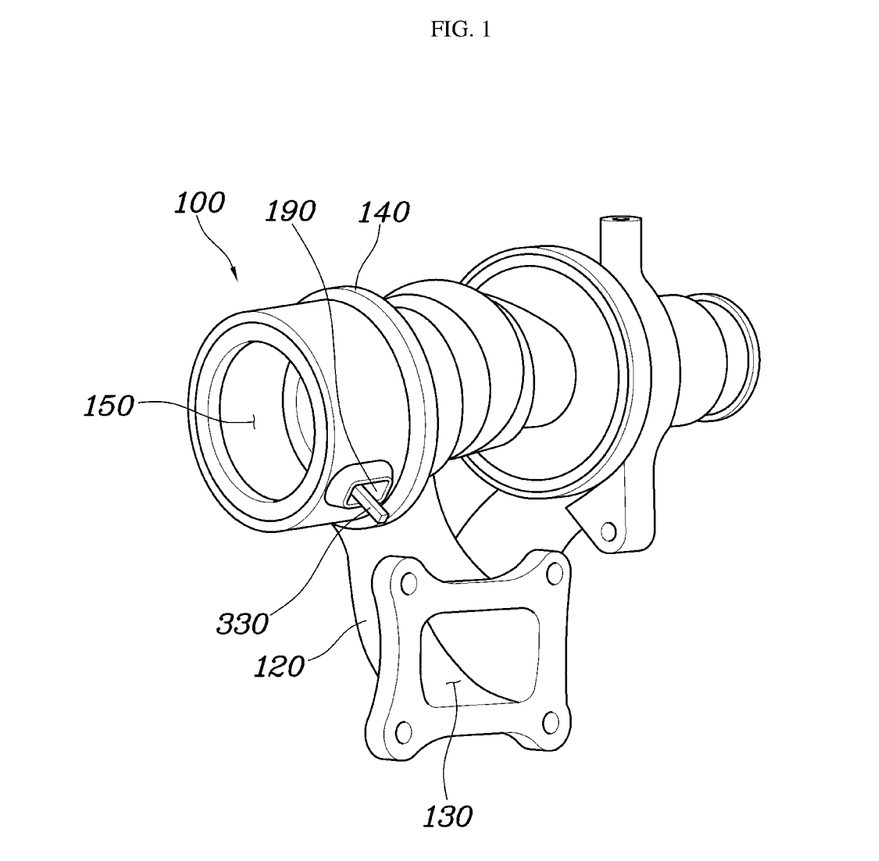
FIG. 1 is a view illustrating the external appearance of a turbine housing of a turbocharger according to an exemplary embodiment of the present invention.
Figure 2:
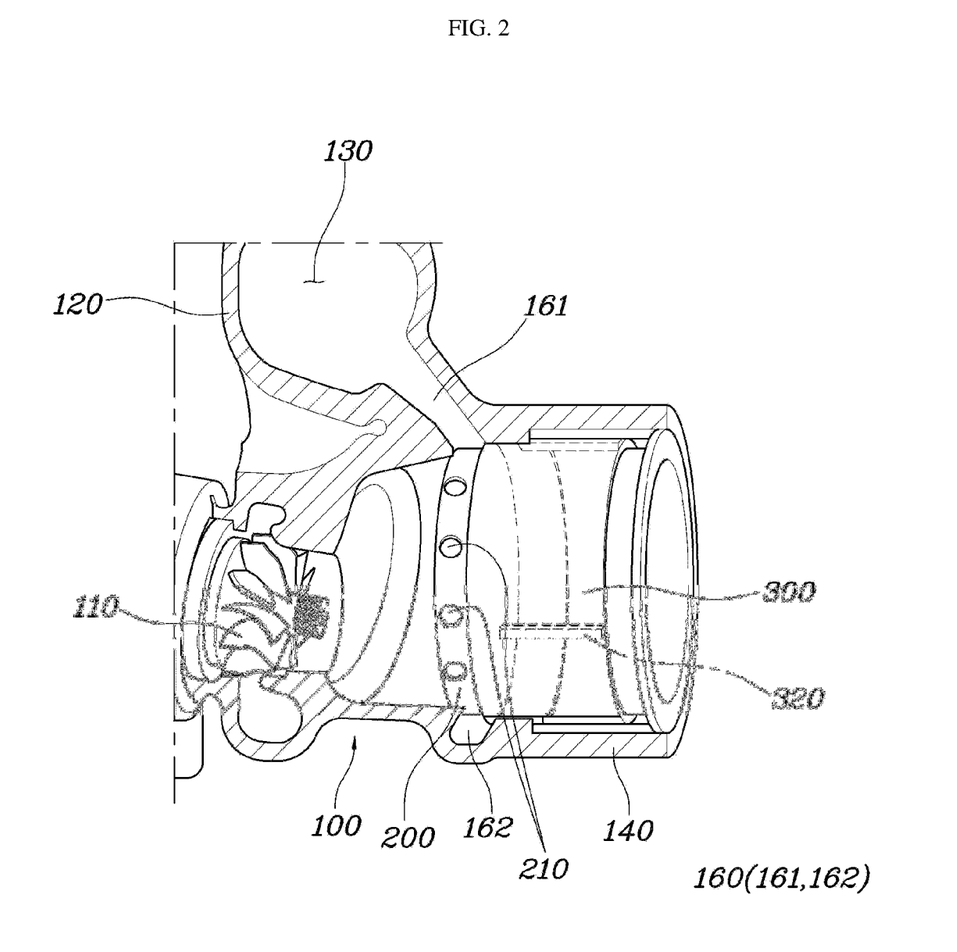
FIG. 2 is a view illustrating the coupling structure of a first exemplary embodiment of a waste gate valve and a turbine wheel inside the turbine housing according to an exemplary embodiment of the present invention.
Figure 3:
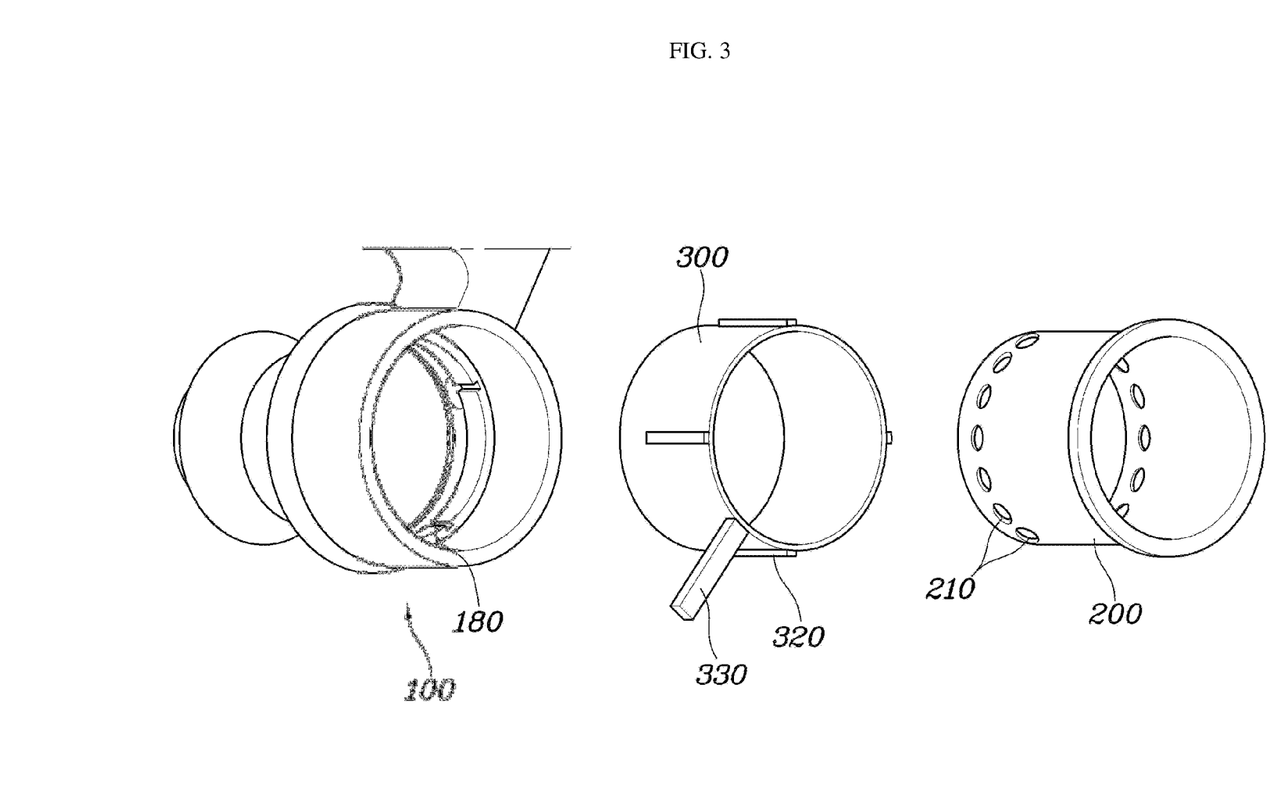
FIG. 3 is a detailed perspective view of a mixer ring and a control valve illustrated in FIG. 2 according to an exemplary embodiment of the present invention.

As shown in FIG. 3, the bypass apertures 210 may be arranged at equidistant intervals from each other in the circumferential direction of the mixer ring 200. In addition, the bypass apertures 210 may be formed with the degree of opening of each of the bypass apertures 210 identical to that of all other bypass apertures 210 when the control valve 300 moves. Specifically, the bypass apertures 210 may be formed to have a circular aperture configuration and may be arranged to be aligned with each other in the circumferential direction of the mixer ring 200.

Therefore, when the control valve 300 moves, the bypass apertures 210 may be opened or closed at the same time, thereby facilitating an increase in the effective sectional area of the bypass apertures 210. As a result, a substantial amount of exhaust gas may be diverted, which is effective in increasing the temperature of the catalytic converter. Hereinafter, the configuration of a first exemplary embodiment for moving the control valve 300 in the waste gate valve of the present invention will be described with reference to FIGS. 3 to 4B. The waste gate valve according to the first exemplary embodiment may further include an actuator 400 configured to supply moving force to the control valve 300 in the axial direction.

In particular, the control valve 300 may be formed in the shape of a ring that has a solid circumferential surface overall. When the control valve 300 moves toward a first end portion or a second end portion of the mixer ring 200 in the axial direction, the control valve 300 may overlap the bypass apertures 210 or move away from the bypass apertures 210, thereby regulating the degree of opening of the bypass apertures 210. Accordingly, the length of the control valve 300 in the axial direction is shorter than the length of the mixer ring 200 in the axial direction. The length of the control valve 300 in the axial direction may be set to completely open or completely close the bypass apertures 210 when the control valve 300 moves within a predetermined displacement range in the axial direction.

In other words, when the control valve 300 is disposed at the left side, as shown in FIG. 4A, the control valve 300 may be configured to cover and close the bypass apertures 210, whereby exhaust gas may be prevented from being diverted through the bypass passage 160. When the control valve 300 is moved to the right side, as shown in FIG. 4B, the bypass apertures 210 may be opened, whereby the exhaust gas introduced into the bypass passage 160 may flow into the discharge pipe 140 via the bypass apertures 210. Accordingly, diverted flow of the exhaust gas introduced through the introduction pipe 120 is realized.

According to the above-described configuration, unlike a conventional swing-arm-type waste gate valve, the valve according to the present invention may be operated in a sliding manner that does not interfere with the flow of the exhaust gas discharged from the turbine wheel 110, whereby the amount of operational force applied to the valve may be reduced. Therefore, valve control responsivity may be improved, abrasion of sliding parts (e.g., a valve shaft, a bush, etc.) may be reduced, and operational noise may be reduced since a valve-seating operation does not occur during the operation of the valve.

In addition, the control valve 300 may include a first guide 320, formed at the outer circumferential surface thereof in the axial direction. The discharge pipe 140 may include a second guide 180, formed at the inner circumferential surface thereof in the axial direction. The second guide 180 may be disposed at a position that corresponds to the position of the first guide 320 and has a shape that corresponds to the shape of the first guide 320 to guide the movement of the control valve 300 in the axial direction.

For example, the first guide 320 may be formed in the shape of a protrusion that protrudes toward the discharge pipe 140, and the second guide 180 may be formed in the shape of a recess that allows the protrusion to be inserted thereinto and may be configured to guide the movement of the protrusion. In other words, the first guide 320 and the second guide 180 may be configured to guide the translational motion of the control valve 300 in the axial direction while restricting the rotational motion of the control valve 300 in the circumferential direction. As a result, the translational motion of the control valve 300 in the axial direction may be guided more stably.

In particular, the first guide 320 may be formed to avoid exposure to the bypass passage 160 when the bypass apertures 210 are completely closed. For example, the first guide 320 may not extend to the end of the bypass passage 160 in the direction toward the bypass apertures 210. Specifically, the first guide 320 may be formed to have a length shorter than the length of the control valve 300 in the axial direction by the width of the bypass passage 160 (the second passage) or greater. Therefore, when some of the exhaust gas is diverted and flows along the second passage 162, it may be possible to avoid interference between the exhaust gas and the first guide 320 and consequently to prevent the occurrence of resistance to the flow of the exhaust gas.

Figure 5:
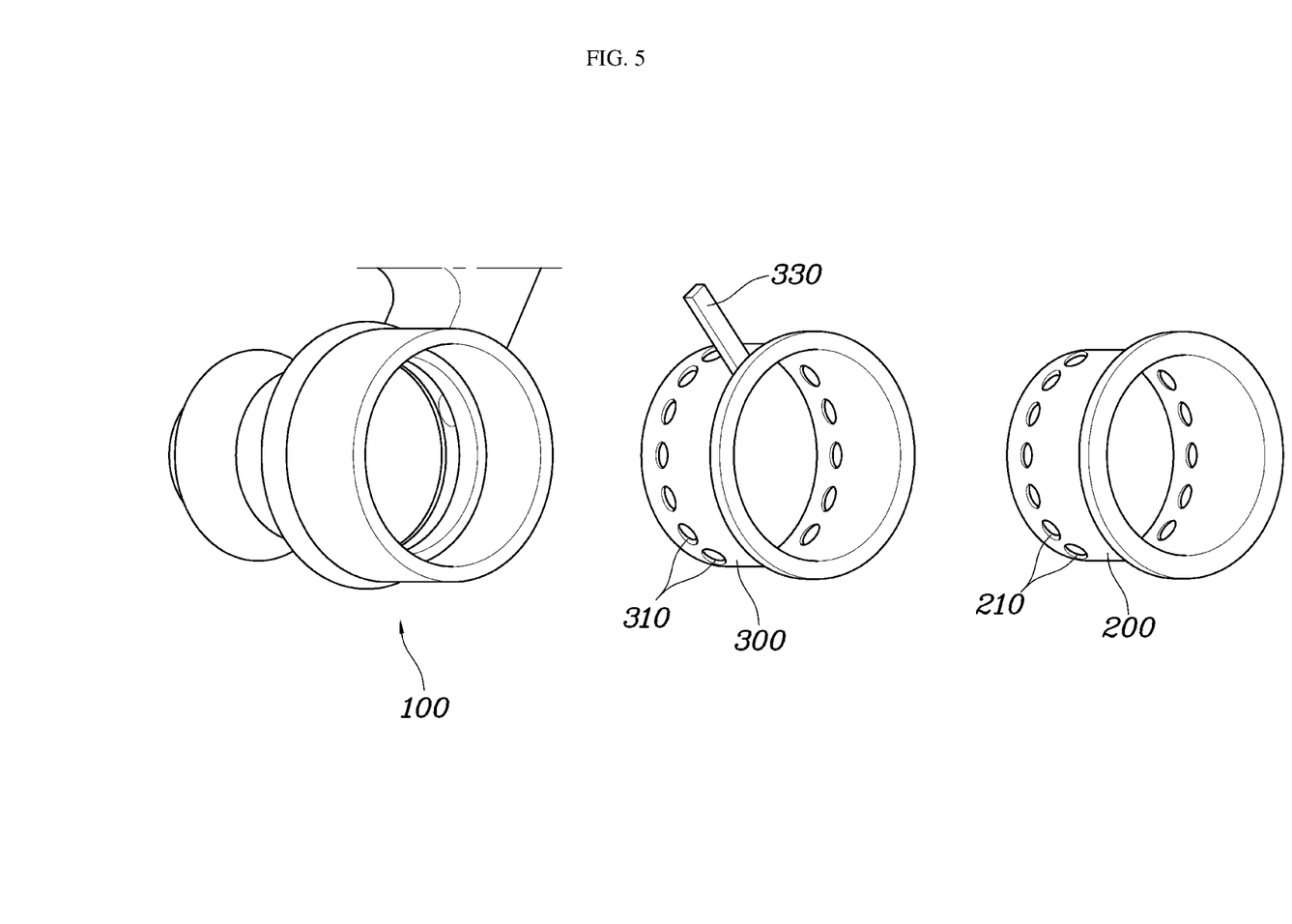
FIG. 5 is a detailed perspective view of a mixer ring and a control valve in a second exemplary embodiment of the waste gate valve of the present invention.

Hereinafter, the configuration of a second exemplary embodiment for moving the control valve 300 in the waste gate valve of the present invention will be described with reference to FIGS. 5 to 6B. The waste gate valve according to the second exemplary embodiment may further include an actuator 400 configured to supply rotational force to the control valve 300 in the circumferential direction.

In particular, the control valve 300 may include overlap apertures 310 therein formed in the circumferential direction of the control valve 300 to be disposed at positions that correspond to the positions of the bypass apertures 210 and to have a shape that corresponds to the shape of the bypass apertures 210. When the control valve 300 rotates in the circumferential direction, the overlap apertures 310 overlap the bypass apertures 210 or move away from the bypass apertures 210, thereby regulating the degree of opening of the bypass apertures 210.

For example, the overlap apertures 310 may be formed to have the same shape as the shape of the bypass apertures 210. However, the overlap apertures 310 may be formed to have a shape different from the shape of the bypass apertures 210, as long as all the overlap apertures 310 overlap or move away from the corresponding bypass apertures 210 at the same time based on the rotation of the control valve 300.

The control valve 300 may include a flange-shaped stopper, which protrudes along the circumference of the end thereof. The stopper of the control valve 300 may be fixed to a portion of the inner circumferential surface of the discharge pipe 140. When the control valve 300 is disposed as shown in FIG. 6B, the control valve 300 may be configured to cover and close the bypass apertures 210, whereby exhaust gas may be prevented from being diverted through the bypass passage 160.

Figure 6A:
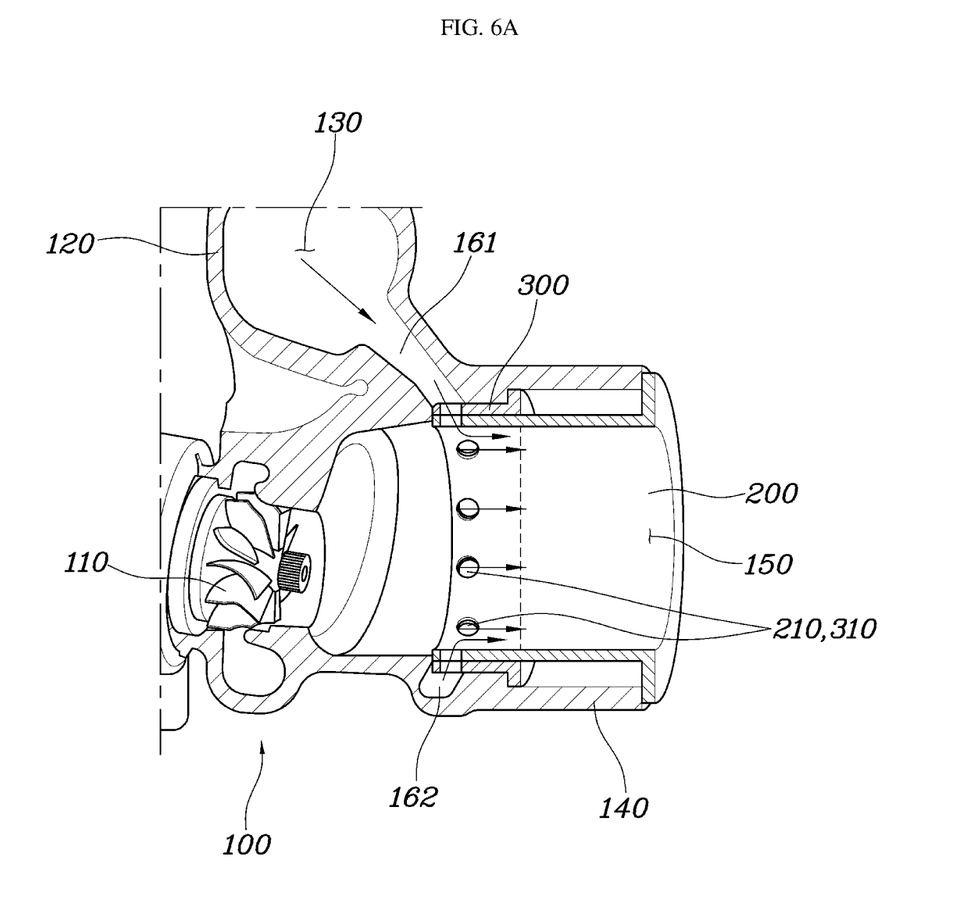
FIGS. 6A and 6B are views illustrating the opening operation and the closing operation of the waste gate valve illustrated in FIG. 5 according to an exemplary embodiment of the present invention.

When the control valve 300 is rotated as shown in FIG. 6A, the bypass apertures 210 may be opened, and thus, the exhaust gas introduced into the bypass passage 160 may flow into the discharge pipe 140 via the bypass apertures 210. Accordingly, diverted flow of the exhaust gas introduced through the introduction pipe 120 may be realized. The turbine housing 100 may include a knob aperture 190 therein formed to correspond to the displacement range of the control valve 300.

Additionally, a knob 330 may penetrate the knob aperture 190. In particular, a first end of the knob 330 may be fixed to the control valve 300, and a second end of the knob 330 may be connected to the actuator 400. For example, in the exemplary embodiment illustrated in FIGS. 4A and 4B, since the control valve 300 moves in the axial direction of the discharge pipe 140, the knob aperture 190 may be formed in the axial direction of the discharge pipe 140. Therefore, the knob 330 may be moved in the axial direction within the knob aperture 190 by the operation of the actuator 400.

Figure 6B:
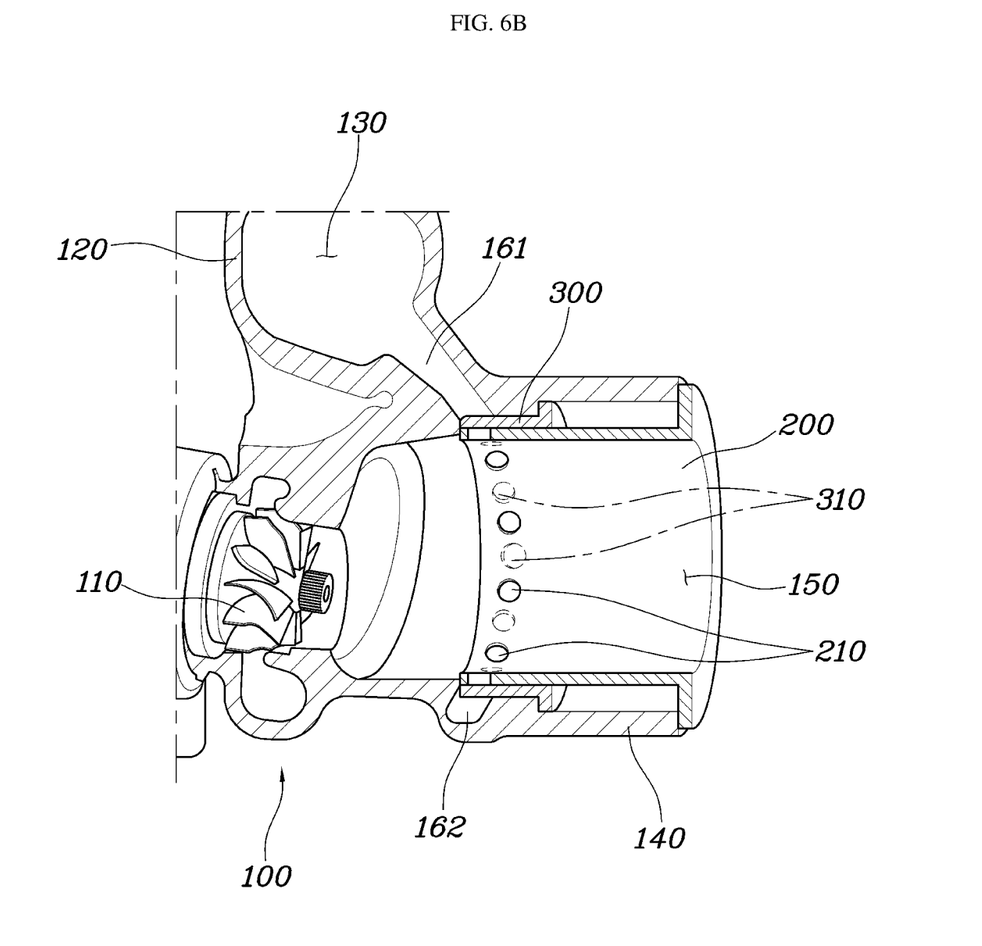

In the exemplary embodiment illustrated in FIGS. 6A and 6B, since the control valve 300 may be configured to rotate in the circumferential direction of the discharge pipe 140, the knob aperture 190 may be formed in the circumferential direction of the discharge pipe 140. Therefore, the knob 330 may be rotated in the circumferential direction within the knob aperture 190 by the operation of the actuator 400.

As is apparent from the above description, according to the present invention, since the bypass apertures 210 may be arranged at equidistant intervals from each other in the circumferential direction of the discharge pipe 140, exhaust gas, which is diverted through the bypass apertures 210, may be discharged more evenly along the inner circumferential surface of the discharge pipe 140. Therefore, the flow uniformity of the diverted exhaust gas may be improved, and thus the exhaust gas may be introduced more evenly into the catalytic converter, which is effective in increasing the temperature of the catalytic converter.

In addition, unlike a conventional swing-arm-type waste gate valve, the valve according to an exemplary embodiment of the present invention may be operated in a sliding manner that prevents interference with the flow of the exhaust gas discharged from the turbine wheel 110, whereby the amount of operational force applied to the valve may be reduced. Therefore, valve control responsivity may be improved, abrasion of sliding parts (e.g., a valve shaft, a bush, etc.) may be reduced, and operational noise may be reduced due to a valve-seating operation being prevented from occurring during the operation of the valve.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A waste gate valve for a turbocharger, comprising:
a turbine housing that accommodates a turbine wheel therein and includes a bypass passage formed therein to divert exhaust gas introduced into the turbine wheel to a discharge passage, a portion of the bypass passage being formed along an inner circumferential surface of the discharge passage;
a mixer ring formed to block a region between the bypass passage and the discharge passage and including therein bypass apertures arranged along the bypass passage formed in an inner circumferential surface of the discharge passage;
a control valve configured to switch a state of the bypass apertures to an open state or a closed state via movement thereof to regulate an opening degree of the bypass apertures;
an actuator configured to supply rotational force to the control valve in a circumferential direction,
wherein the control valve includes overlap apertures therein formed in the circumferential direction thereof to be disposed at positions that are same as positions of the bypass apertures and to have a shape that corresponds is equal to a shape of the bypass apertures,
wherein, when the control valve rotates in the circumferential direction, the overlap apertures overlap the bypass apertures or move away from the bypass apertures to regulate an opening degree of the bypass apertures, and
wherein the bypass passage includes:
a first passage formed between an introduction pipe through which exhaust gas is introduced into the turbine housing and a discharge pipe through which exhaust as is discharged; and a second passage that communicates with the first passage and is formed in a shape of a recess that extends along an inner circumferential surface of the discharge pipe, wherein the bypass apertures formed in the mixer ring are disposed between the second passage and the discharge passage.

2. The waste gate valve according to claim 1, wherein the mixer ring is fixedly inserted into the discharge pipe, and the control valve is movably inserted between an outer circumferential surface of the mixer ring and the inner circumferential surface of the discharge pipe.

3. The waste gate valve according to claim 1, wherein the bypass apertures are arranged at equidistant intervals from each other in a circumferential direction of the mixer ring.

4. The waste gate valve according to claim 3, wherein the opening degree of each of the bypass apertures is identical to the opening degree of all other bypass apertures when the control valve moves.

5. The waste gate valve according to claim 1, wherein the turbine housing includes a knob aperture therein, and wherein the control valve includes a knob that penetrates the knob aperture, the knob having a first end fixed to the control valve and a second end connected to the actuator.

6. The waste gate valve according to claim 1, wherein the recess that defines the second passage is formed with a circumference of a first side thereof, disposed adjacent to the turbine wheel, having a smaller inner diameter than a circumference of a second side thereof, disposed distant from the turbine wheel, wherein a support flange is formed along the circumference of the first side of the recess disposed adjacent to the turbine wheel, and wherein an end of the mixer ring is supported by the support flange.

\* \* \* \* \*